United States Patent
Sethi et al.

(10) Patent No.: US 11,869,060 B2
(45) Date of Patent: Jan. 9, 2024

(54) AUTOMATED AND CUSTOMIZED ENTITLEMENT RECOMMENDATION

(71) Applicant: Dell Products L.P., Round Rock, TX (US)

(72) Inventors: Parminder Singh Sethi, Ludhiana (IN); Sathish Kumar Bikumala, Round Rock, TX (US); Deepak Gowda, Cary, NC (US)

(73) Assignee: Dell Products L.P., Round Rock, TX (US)

( * ) Notice: Subject to any disclaimer, the term of this patent is extended or adjusted under 35 U.S.C. 154(b) by 318 days.

(21) Appl. No.: 16/917,175

(22) Filed: Jun. 30, 2020

(65) Prior Publication Data

US 2021/0406976 A1    Dec. 30, 2021

(51) Int. Cl.
*G06Q 30/0601* (2023.01)
*G06Q 10/20* (2023.01)
*G06N 3/08* (2023.01)
*G06F 40/30* (2020.01)

(52) U.S. Cl.
CPC .......... *G06Q 30/0631* (2013.01); *G06N 3/08* (2013.01); *G06Q 10/20* (2013.01); *G06F 40/30* (2020.01)

(58) Field of Classification Search
CPC ........................ G06Q 30/0631; G06Q 10/20
See application file for complete search history.

(56) References Cited

U.S. PATENT DOCUMENTS

| | | | | |
|---|---|---|---|---|
| 2019/0138964 A1* | 5/2019 | Morita | ............. | G06Q 10/06315 |
| 2019/0180358 A1* | 6/2019 | Nandan | ................ | G06K 9/6219 |
| 2020/0034909 A1* | 1/2020 | Noplos | ................. | G06Q 10/20 |
| 2020/0162342 A1* | 5/2020 | Fattu | ....................... | H04L 43/08 |
| 2021/0004706 A1* | 1/2021 | Riddle | ................. | G06Q 30/016 |
| 2021/0042708 A1* | 2/2021 | Gardiner | ............... | G06Q 10/02 |
| 2021/0342790 A1* | 11/2021 | Dagley | ................. | G06F 16/787 |

FOREIGN PATENT DOCUMENTS

WO    WO-2019081399 A1 *   5/2019   ......... G06F 21/6254

OTHER PUBLICATIONS

Serviceaide Announces New Release of Intelligent Service Management Platform with Added AI Capabilities—Latest Version of Service Management Solution Intelligently Prioritizes and Assigns Service Tickets and Recommends Solutions to Improve Time and Cost of Resolution. PR Newswire. San Jose, Ca. (Year: 2019).*

Wikipedia, "Convolutional Neural Network," https://en.wikipedia.org/w/index.php?title=Convolutional_neural_network&oldid=963992200, Jun. 22, 2020, 29 pages.

S. Sharma, "Activation Functions in Neural Networks," Towards Data Science, https://towardsdatascience.com/activation-functions-neural-networks-1cbd9f8d91d6, Sep. 6, 2017, 11 pages.

* cited by examiner

*Primary Examiner* — Michael Misiaszek
(74) *Attorney, Agent, or Firm* — Ryan, Mason & Lewis, LLP

(57) ABSTRACT

A method comprises extracting data for one or more assets corresponding to a user, and analyzing the data using one or more machine learning models. The analyzing comprises predicting whether the one or more assets will require at least one of replacement and service. In the method, one or more entitlement recommendations for the user are generated based on the analysis, and the one or more entitlement recommendations are transmitted to the user.

20 Claims, 13 Drawing Sheets

AUTOMATED AND CUSTOMIZED ENTITLEMENT RECOMMENDATION

FIELD

The field relates generally to information processing systems, and more particularly to management and customization of entitlement plans.

BACKGROUND

An entitlement is a term given to items and/or services offered by an enterprise to customers when purchasing equipment or a part or piece of equipment (e.g., for use in a private cloud managed by the customer) or otherwise using the equipment on-demand (e.g., for use in a public cloud managed by the enterprise). Such entitlements may include, but are not limited to, maintenance and support services, training, warranties for physical hardware, as well as other subscriptions. Entitlements are often tied to unique hardware identifiers (IDs). For example, an entitlement may define the type of support that a customer receives as well as the supported communication channels. An entitlement can be associated with different types of items, e.g., a product, an asset, an account or a contract. Often, it is very difficult for a customer to assess the appropriate entitlement that meets both a service level agreement (SLA) as well as cost. Hence, it is challenging for a customer to select the appropriate entitlement, renew an existing entitlement, or otherwise obtain an appropriate entitlement that does not result in over-payment and/or under-utilization of the features offered by a particular entitlement plan.

SUMMARY

Illustrative embodiments provide techniques for managing and recommending entitlements.

In one embodiment, a method comprises extracting data for one or more assets corresponding to a user, and analyzing the data using one or more machine learning models. The analyzing comprises predicting whether the one or more assets will require at least one of replacement and service. In the method, one or more entitlement recommendations for the user are generated based on the analysis, and the one or more entitlement recommendations are transmitted to the user.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

DETAILED DESCRIPTION

Figure 1:
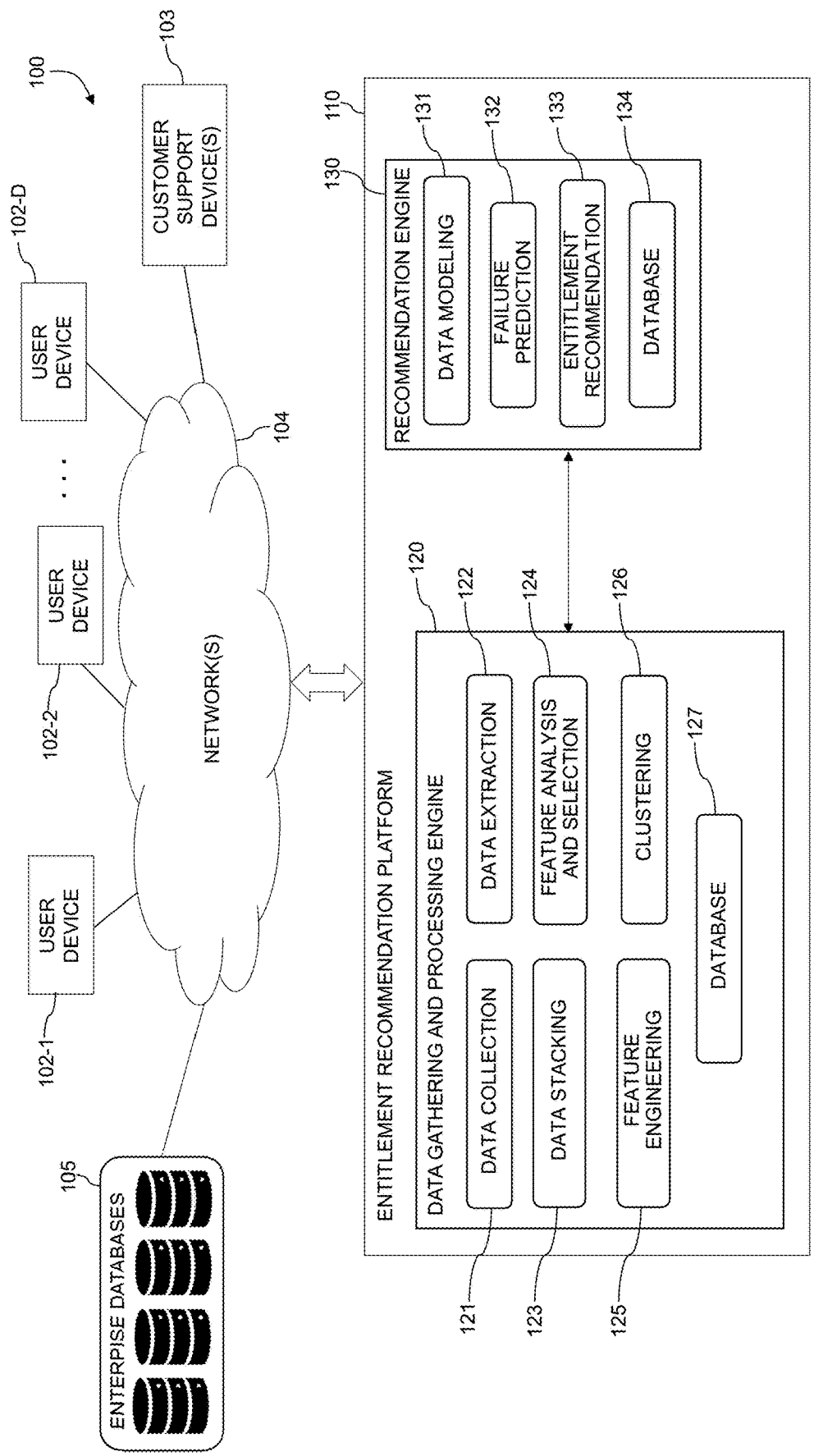
FIG. 1 depicts details of an information processing system with an entitlement recommendation platform for automatically generating customized entitlement recommendations for customers according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, "natural language processing (NLP)" can refer to interactions between computers and human (natural) languages, where computers are able to derive meaning from human or natural language input, and respond to requests and/or commands provided by a human using natural language.

As used herein, "natural language understanding (NLU)" can refer to a sub-category of natural language processing in artificial intelligence (AI) where natural language input is disassembled and parsed to determine appropriate syntactic and semantic schemes in order to comprehend and use languages. NLU may rely on computational models that draw from linguistics to understand how language works, and comprehend what is being said by a user.

Different entitlements may be available from an enterprise to its customers. Each entitlement may come with a different level of service and an SLA. As a customer, it may be difficult to choose the appropriate entitlement among all of the available ones. Further, a customer may wish to have a check every cycle and see whether he/she is availing the services for the respective entitlement or may need to upgrade/downgrade from the current entitlement plan. In an illustrative embodiment, machine learning techniques are used to recommend a best-fit (appropriate) entitlement that a customer will likely need in a subsequent cycle by considering past and future needs of the customer with regard to procured and/or leased parts or other equipment of an information processing system.

FIG. 1 shows an information processing system 100 configured in accordance with an illustrative embodiment. The information processing system 100 comprises user devices 102-1, 102-2, . . . 102-D (collectively "user devices 102") and customer support devices 103. The user devices 102 and the customer support devices 103 communicate over a network 104 with an entitlement recommendation platform 110. In addition, the user devices 102 communicate with the customer support devices 103 and vice versa over the network 104.

The user devices 102 and customer support devices 103 can comprise, for example, Internet of Things (IoT) devices, desktop, laptop or tablet computers, mobile telephones, or other types of processing devices capable of communicating with the entitlement recommendation platform 110 and each other over the network 104. Such devices are examples of what are more generally referred to herein as "processing devices." Some of these processing devices are also generally referred to herein as "computers." The user devices 102 and customer support devices 103 may also or alternately comprise virtualized computing resources, such as virtual machines (VMs), containers, etc. The user devices 102 and/or customer support devices 103 in some embodiments comprise respective computers associated with a particular company, organization or other enterprise. The variable D and other similar index variables herein such as L and P are assumed to be arbitrary positive integers greater than or equal to two.

The terms "client", "customer" or "user" herein are intended to be broadly construed so as to encompass numerous arrangements of human, hardware, software or firmware entities, as well as combinations of such entities. Entitlement recommendation services may be provided for users utilizing one or more machine learning models, although it is to be appreciated that other types of infrastructure arrangements could be used. Users may refer to customers or clients and vice versa. At least a portion of the available services and functionalities provided by the entitlement recommendation platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the entitlement recommendation platform 110, as well as to support communication between the entitlement recommendation platform 110 and connected devices (e.g., user devices 102 and customer support devices 103) and/or other related systems and devices not explicitly shown.

In some embodiments, the customer support devices 103 are assumed to be associated with repair technicians, system administrators, information technology (IT) managers, software developers, release management personnel or other authorized personnel configured to access and utilize the entitlement recommendation platform 110.

The information processing system 100 further includes enterprise databases 105 connected to the user devices 102, to the customer support devices 103 and to the entitlement recommendation platform 110 via the network 104. The enterprise databases 105 store data associated with users of an enterprise's products and/or services, as well as data associated with products and/or services offered by the enterprise. As described further herein, referring to FIGS. 2-5, 6, 8 and 10, the enterprise databases 105 store data associated with one or more entitlement plans 241 (FIG. 2) offered by the enterprise, as well as whether users are subscribed to any of the entitlement plans, and the corresponding assets that may be subject to the entitlement plans 241. For example, referring to the table 345 in FIG. 3, the entitlement plan data 241 includes, for example, an entitlement plan identifier (ID) such as, for example, "Basic," "Pro" and "Pro Plus," and their respective descriptions. For example, the Basic entitlement plan is valid for one year and offers a standard warranty, the Pro entitlement plan is valid for two years and offers an extended warranty, and the Pro Plus plan is valid for three years and offers the extended warranty as well as free parts replacement. The entitlement plan data 241 also includes the communication channels associated with each plan, such as, for example, chat, email, phone and onsite, the turnaround time for a service request as specified in an SLA (e.g., 24, 48 or 72 hours) and the respective prices of each plan (e.g., $0, $100 and $300). The assets that are the subject of the entitlement plans may be owned or leased for use by users, and include, for example, hardware components (e.g., laptops, printers, modems, servers, storage arrays, etc.) and/or parts for hardware components (e.g., hard disks, drives, batteries, connectors, fans, circuit boards, etc.), software and/or services.

The data stored in the enterprise databases 105 also includes customer installation data 242, which includes information about the customers of an enterprise and their corresponding assets. For example, referring to table 346 in FIG. 3, the customer installation data 242 includes a customer ID, which may include a name of the customer and/or other identifying codes, the assets that are associated with that customer, installation dates, asset location, asset quantity, asset ID and the entitlement plan associated with the customer and corresponding asset.

The data stored in the enterprise databases 105 also includes asset telemetry data 243, which includes information about particular assets, including asset ID, parts of the asset and details about the performance of the asset. For example, referring to table 347 in FIG. 3, in connection with asset ID 1001, which in this case refers to a laptop, the total number of active hours for a hard disk and a battery of the laptop are monitored and recorded by the enterprise. In addition, the data 243 includes performance statistics (e.g., capacity, output, power ratings, etc.), whether the part was replaced, and when the part may have failed. In some cases, the asset telemetry data 243 can be retrieved directly from an asset, which may store such data on storage devices associated with and/or connected to the asset.

The data stored in the enterprise databases 105 also includes issues/tickets data 244, which includes information about problems with components or parts, and their service history. For example, referring to table 348 in FIG. 3, respective issues/problems may be associated with an issue ID, and include a corresponding description (e.g., hard disk failure), a corresponding asset ID, start and end dates for service, how the problem was resolved (e.g., part replacement), the cost of the resolution, an assessment of the problem's impact on the customer, and an assessment of the severity of the problem. The data stored in the enterprise databases 105 includes real-time changes in entitlement plan, customer installation, asset telemetry and issues/tickets data 241-244.

The entitlement recommendation platform 110 in the present embodiment is assumed to be accessible to the user devices 102 and customer support devices 103, and vice-versa, over the network 104. In addition, the entitlement recommendation platform 110 and the user devices 102 can access the enterprise databases 105 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The entitlement recommendation platform 110, on behalf of respective infrastructure tenants each corresponding to one or more users associated with respective ones of the user devices 102, provides a platform for automatically generating customized entitlement recommendations, which are tailored to each user.

Referring to FIG. 1, the entitlement recommendation platform 110 comprises a data gathering and processing engine 120 and a recommendation engine 130. The data gathering and processing engine 120 includes a data collection component 121, a data extraction component 122, a data stacking component 123, a feature analysis and selection component 124, a feature engineering component 125, a clustering component 126 and a database 127. The recommendation engine 130 includes a data modeling component 131, a failure prediction component 132, an entitlement recommendation component 133 and a database 134.

Figure 2:
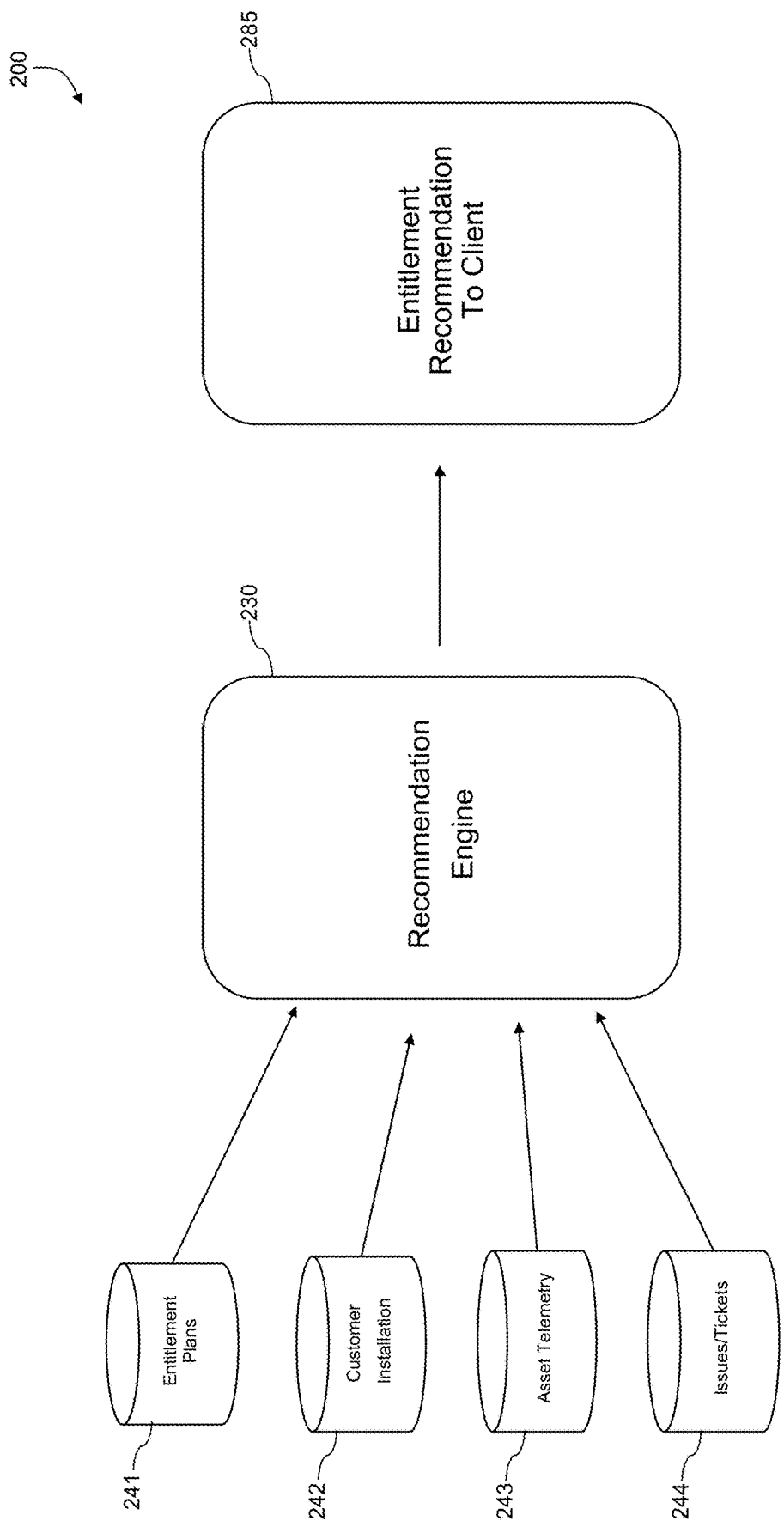
FIG. 2 depicts details of an operational flow for automatically generating customized entitlement recommendations according to an illustrative embodiment.
Figure 3:
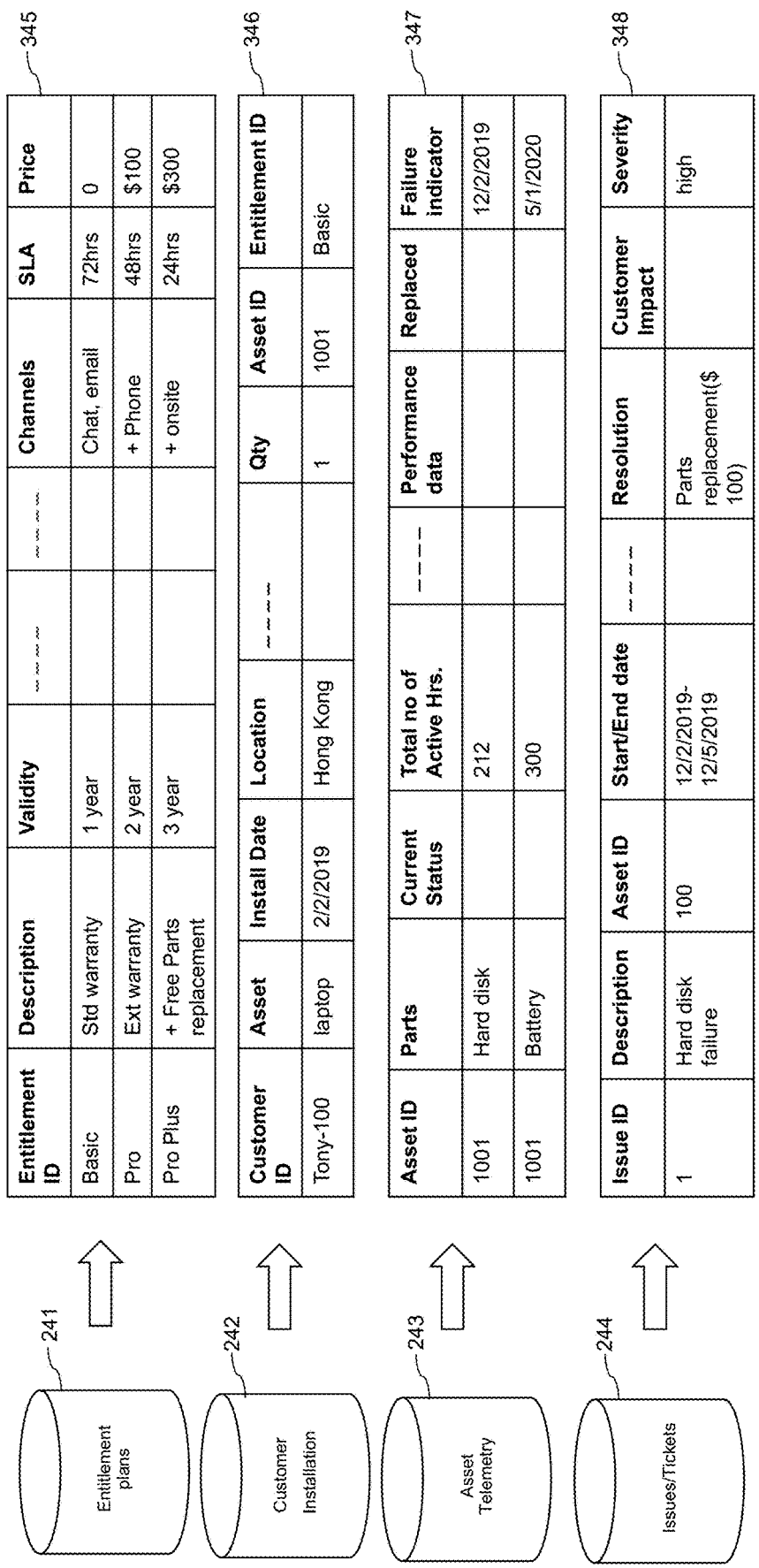
FIG. 3 depicts details of data extracted from different sources according to an illustrative embodiment.
Figure 4:
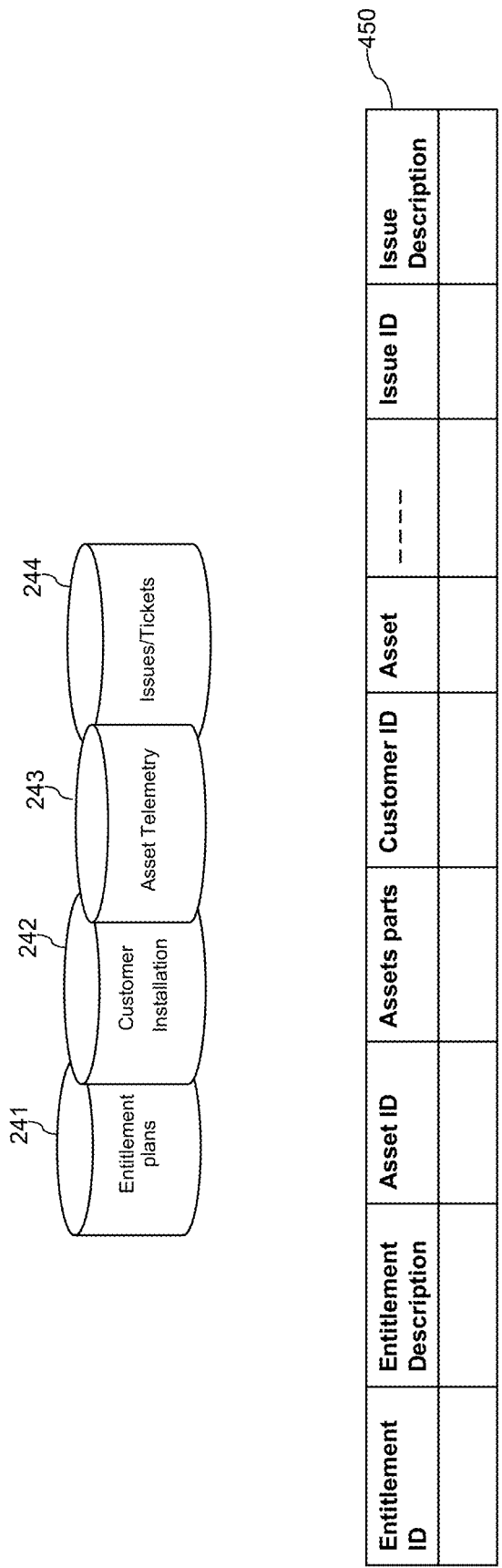
FIG. 4 depicts generation of a unified dataset according to an illustrative embodiment.

Referring to the system 100 in FIG. 1 and to the operational flow 200 in FIG. 2, according to one or more embodiments, the data collection component 121 of the data gathering and processing engine 120 collects the entitlement plan data 241, the customer installation data 242, the asset telemetry data 243 and the issues/tickets data 244 from the enterprise databases 105 for a plurality of users. The collected data may be stored in one or more databases 127 associated with the data gathering and processing engine 120.

According to an embodiment, the data extraction component 122 extracts relevant data corresponding to a user. For example, in response to a request for service made by a user and/or in response to a determination or identification by the entitlement recommendation platform 110 that an entitlement plan renewal reminder should be sent to the user, the data extraction component 122 extracts information pertaining to the user from the collected data. The extracted information includes, for example, entitlement plan, asset and part, installation and service ticket data corresponding to the user as shown in tables 345, 346, 347 and 348. In one or more embodiments, the data extraction is automatically triggered when a reminder for entitlement plan payment is to be sent so that an entitlement plan recommendation is automatically transmitted to a user with the reminder. Additionally, data extraction may be automatically triggered when there is a request for service or part replacement initiated by a user. In response, the entitlement recommendation platform 110 transmits a recommendation for change in entitlement if needed.

Prior to being sent to the recommendation engine 130/230, the data is processed and transformed according to various techniques. For example, referring to FIG. 4, the data is horizontally stacked using the data stacking component 123 to generate a unified dataset, as represented in table 450. In the stacking process, predetermined key/important features of the data are selected by the data stacking component 123 and organized into the unified dataset. In the tabular representation 450 of the unified dataset in FIG. 4, the selected key features of Entitlement ID, Entitlement description, Asset ID, Asset parts, Customer ID, Asset, Issue ID and Issue Description are taken from the tables 345-348 and used to create the table 450 for the unified dataset. The unified dataset is based on the predetermined important features of the data 241-244, and other features of the data 241-244 are omitted from the unified dataset. The embodiments are not necessarily limited to the selected features shown in FIG. 4, and other features can be selected or omitted when forming a unified dataset. Selection of the features is based, at least in part, on whether the features are common across each or multiple ones of the types of data 241, 242, 243 and 244. For example, referring to the tables 345-348, Asset, Asset ID and Entitlement ID appear in multiple ones of the tables 345-348. In addition, because the entitlement plans are directed to the customers, it is determined that the Customer ID is important so that analysis can be based on which assets and entitlements correspond to a particular customer.

Figure 5:
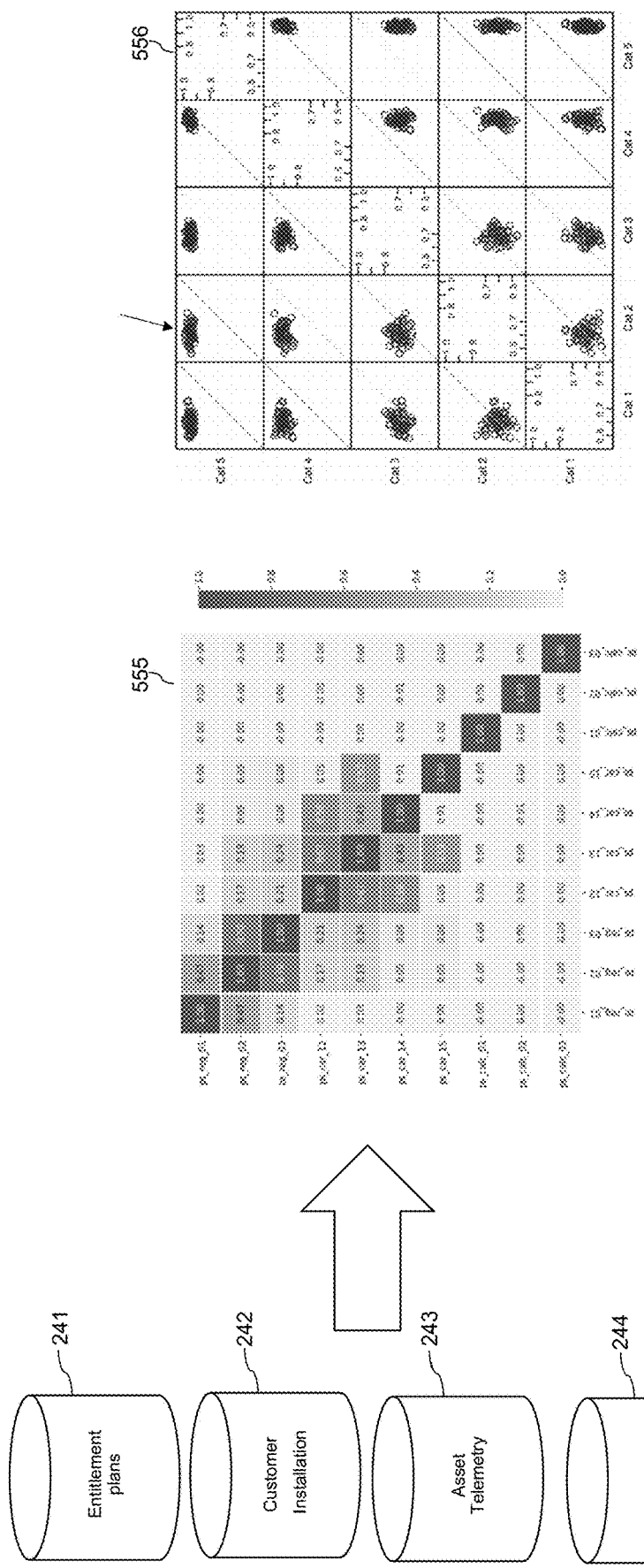
FIG. 5 depicts feature analysis and selection according to an illustrative embodiment.

Referring to FIG. 5, the feature analysis and selection component 124 performs correlation and feature interaction analysis to determine relationships between features in the data and patterns associated with the features. For example, in connection with correlation analysis, the feature analysis and selection component 124 determines the effect of features on each other, such as whether changes in the features are proportional to each other (e.g., if one feature increases, does the compared feature also increase or decrease), how or whether variance of a particular feature affects a compared feature, and whether any patterns can be identified on how one feature affects another feature. A feature (also referred to as a "variable") is a property identified in one of the columns in the table 450 for the unified dataset. A correlation diagram 555 in FIG. 5 illustrates correlation values between features in the x-axis and y-axis, where correlation is on a scale from 0 to 1, where 0 is a lowest correlation and 1 is a highest correlation between features. Each box includes a correlation number between 2 features (one feature in the x-axis and one feature in the y-axis), with the higher correlations being in darker shaded boxes. As shown the correlations having values of 1 are shaded darkest and indicate features having high impact on each other.

Another correlation diagram 556 in FIG. 5 illustrates whether an increase or decrease in one feature causes an increase or decrease in another feature, or causes the other feature to remain at the same value. For example, assuming two features can each be measured by increasing or decreasing values, the correlation diagram 556 illustrates trends for how changes in the value of one feature in a first axis change the value of another feature in the other axis. For example, as shown by the arrow, when category (feature) 2 increases, category (feature) 5 essentially stays at the same level. The circles in each box at the intersection of the categories are data points. Each of the diagrams 555 and 556 can be presented to a user (e.g., an administrative user) as a visualization to see which the effects of features on each other.

Figure 6:
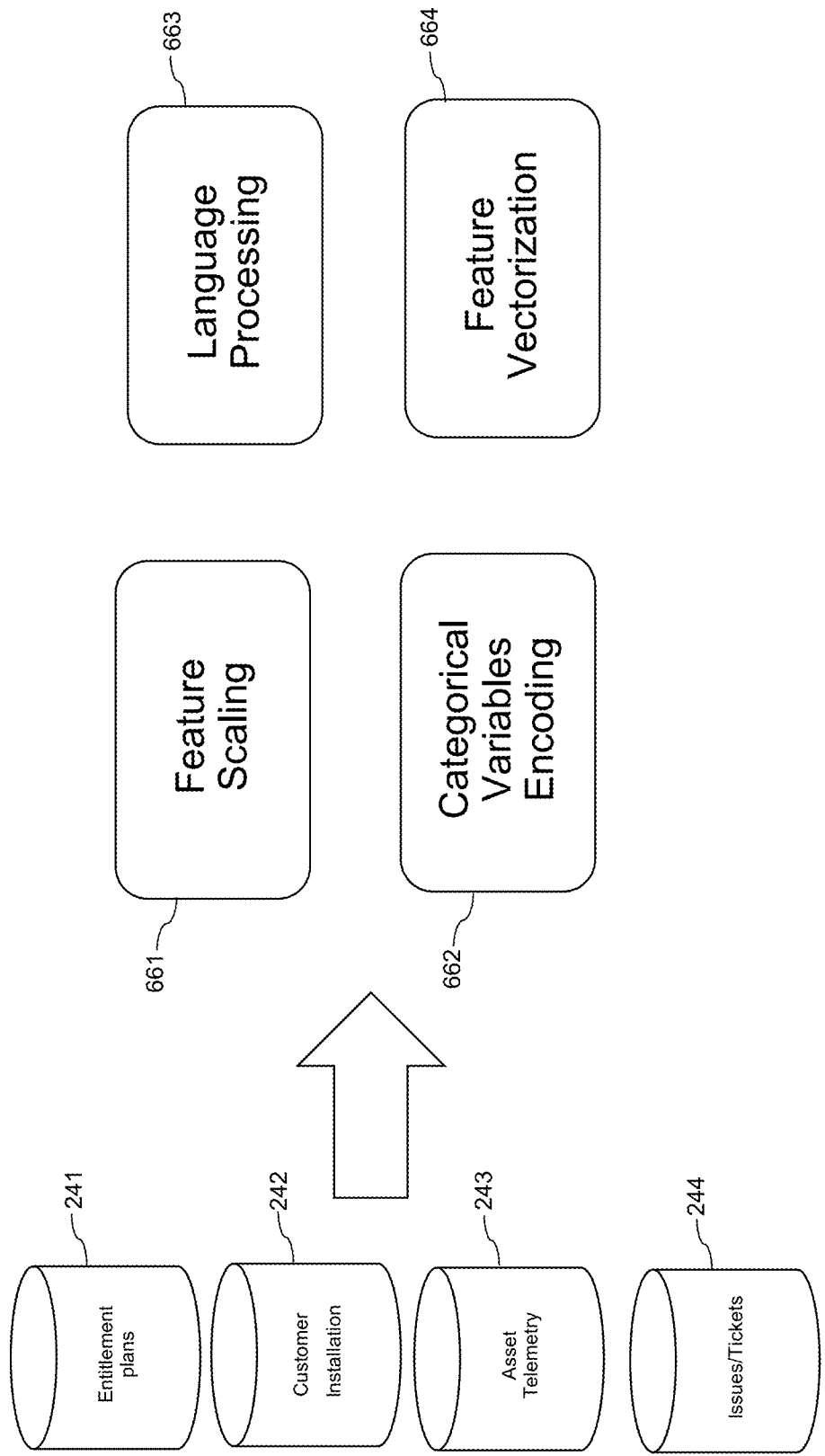
FIG. 6 depicts feature engineering according to an illustrative embodiment.

Referring to FIG. 6, the feature engineering component 125 transforms the data 241-244 for accurate processing by the machine learning models used by recommendation engine 130/230. For example, the feature engineering component 125 includes a feature scaling component 661, a categorical variables encoding component 662, a language processing component 663 and a feature vectorization component 664. The feature scaling component 661 transforms raw data with features that have different units on different scales (e.g., pounds and meters) to data with features that reside in the same scale so that when the data is applied to a machine learning model, the machine learning model does not weigh the features differently. The feature scaling component 661 performs a normalization process on the multiple features to convert the data to the same scale so that the features reside within the same numerical range and can be compared without improper weighting based on the different scales having different numerical ranges. If feature scaling is not performed, the machine learning model may give larger weightage to higher numerical values when it is not appropriate to do so.

The categorical variables encoding component 662 transforms textual data into numerical values so that the data can be analyzed by the machine learning models. For example, using a predetermined convention, textual values are substituted with numerical values based on the convention. The feature vectorization component 664 converts multiple categories of data (e.g., multiple columns of data in tables 345-348 and 450) to a single column, with an entry in vector form. As a precursor to feature vectorization, textual values are substituted with numerals by the categorical variables encoding component 662. For example, if there are columns 1-4 of data, the $5^{th}$ column may contain the values of columns 1-4 in vector form.

The language processing component 663 uses NLP or NLU techniques such as, for example, a word-to-vector (Word2vec) technique, a bag of words (BoW) technique and/or a term frequency-inverse document frequency (tf-idf) technique to identify keywords or key phrases in the data 241-244. For example, according to an embodiment, the language processing component 663 computes a plurality of tf-idf scores for data associated with a particular feature or a plurality of combinations of features. In determining frequencies of use of words in the data 241-244, tf-idf is utilized to identify and rank key words or phrases based on a term or phrase's frequent appearance in a particular category or categories of data and lack of or infrequent appearance in a corpus, wherein the corpus is, for example, a plurality of data categories. For example, tf-idf refers to a numerical statistic reflecting the importance of a word to a category with respect to a corpus. The tf-idf value increases proportionally to the number of times a word appears in the category, but is also offset by the frequency of the word in the corpus, taking into account that some words are generally more common than others.

Figure 7:
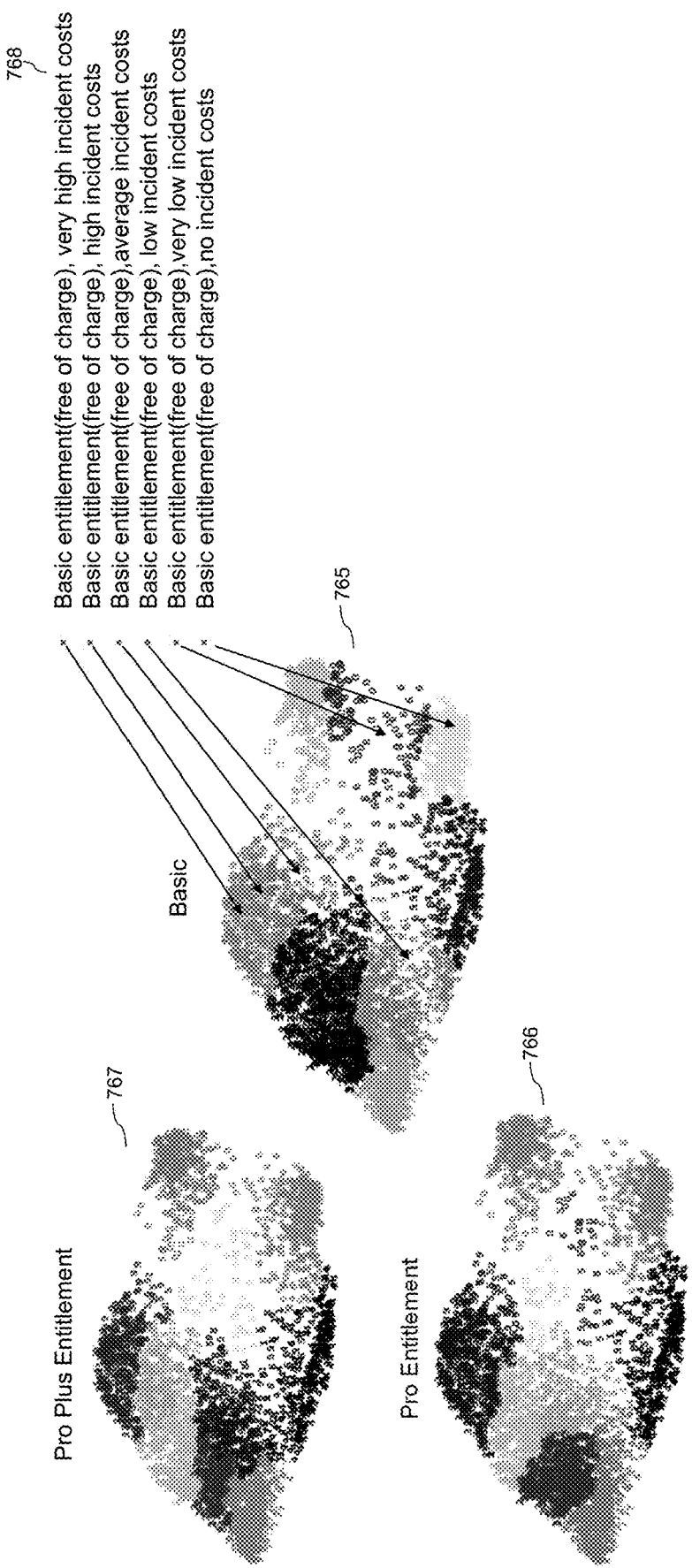
FIG. 7 depicts clustering to convert unsupervised datasets to supervised datasets according to an illustrative embodiment.
Figure 8:
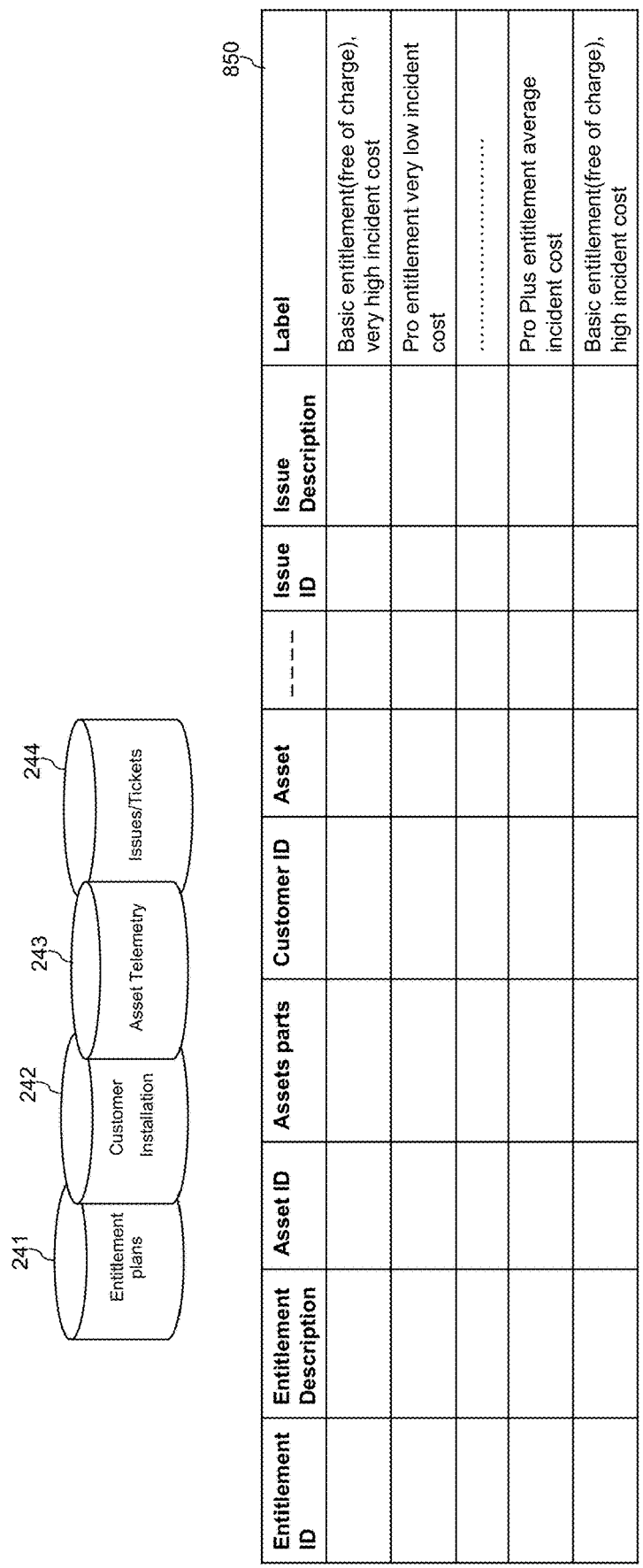
FIG. 8 depicts assignment of clusters to the unified datasets according to an illustrative embodiment.

The clustering component 126 clusters the data 241-244 to convert unsupervised datasets to supervised datasets. For example, as shown in FIG. 7, the clustering component 126 clusters the entitlement plan data 241 to generate a plurality of clusters 765, 766 and 767 based on entitlement level and incident cost. For example, the clusters 765, 766 and 767 respectively correspond to basic, pro and pro plus entitlement levels. Each cluster 765, 766 and 767 is further broken down in subgroups 768 based on "very high incident costs," "high incident costs," "average incident costs," "low incident costs," "very low incident costs" and "no incident costs." Each cluster 765, 766 and 767 provides a visualization of an approximate number of customers falling under a particular subgroup for each cluster category. For example, in the diagrams in FIG. 7, each of the entitlement plans is illustrated as cluster, and the clusters further illustrate the number of customers with that particular entitlement plan that have "very high incident costs," "high incident costs," "average incident costs," "low incident costs," "very low incident costs" and "no incident costs" associated with their service tickets. The embodiments are not limited to clustering entitlement plan data 241, and may cluster other types of data, such as, for example, customer installation data 242, asset telemetry data 243 and issues/tickets data 244.

The clusters 765, 766 and 767 are used by the recommendation algorithm when analyzing costs associated with different entitlement plans given different situations. For example, referring to FIG. 8, the labels of the subgroups for each cluster 765, 766 and 767 are assigned to rows of the table 450 for the unified dataset to generate table 850. Depending on the asset, asset parts, entitlement plan and issue, the clustering component 126 determines the appropriate label for a given horizontal dataset. For example, in the first row, the customer associated with the first customer ID and a corresponding asset and/or asset part has a basic entitlement plan, which resulted in a very high incident cost for the given issue associated with the first issue ID and description. In the second row, the customer associated with the second customer ID and a corresponding asset and/or asset part has a pro entitlement plan, which resulted in a very low incident cost for the given issue associated with the second issue ID and description. In the next to last row, the customer associated with the next to last customer ID and a corresponding asset and/or asset part has a pro plus entitlement plan, which resulted in an average incident cost for the given issue associated with the next to last issue ID and description. In the last row, the customer associated with the last customer ID and a corresponding asset and/or asset part has a basic entitlement plan, which resulted in a high incident cost for the given issue associated with the last issue ID and description. The assignment of the labels facilitates analysis associated with determining differences in cost for the same or similar issues (e.g., the servicing or replacement of the same or similar assets and/or parts) under different entitlement plans.

Referring to FIGS. 1 and 2, the processed and transformed data is input from the data gathering and processing engine 120 to the recommendation engine 130/230 which, utilizing one or more machine learning models, generates an entitlement recommendation 285 that is provided a client/user via, for example a communication network 104 and a user device 102.

The data modeling component 131 of the recommendation engine 130 trains and develops the one or more machine learning models used by the recommendation engine 130 to predict failure and generate individualized entitlement recommendations. According to one or more embodiments, the machine learning model comprises a convolutional neural network (CNN) that sums multiple weighted inputs using activation functions such as, for example, sigmoid activation functions. The machine learning models may utilize one or more other machine learning algorithms including, but not necessarily limited to, Support Vector Machines (SVM), linear regression, logistic regression, decision trees and other types of neural networks.

Figure 9:
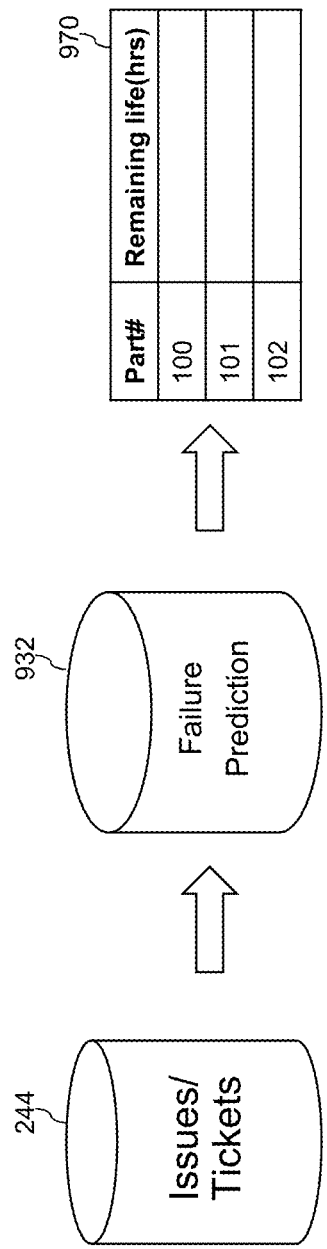
FIG. 9 depicts details of an operational flow for failure prediction according to an illustrative embodiment.

The recommendation engine 130 comprises a failure prediction component 132. Referring to FIG. 9, in order to determine how much cost will be incurred under a current entitlement plan or possibly saved by switching to a different entitlement plan, a failure prediction component 132/932 predicts which assets and/or asset parts will fail or will need some sort of service within a given time period (e.g., within the next 3 months, 6 months, year, etc.). According to one or more embodiments, as shown by table 970, the failure prediction component 132/932 uses issues/tickets data 244 to predict the remaining life of parts and/or assets corresponding to a user. The failure prediction component 132/932 analyzes existing tickets and data on previous issues/tickets from backend application programming interfaces (APIs) of a given enterprise to compute or retrieve the remaining life of one or more assets and/or parts, and identify the current replacement cost or service charge for a given part or asset with no entitlement plan or an entitlement plan that does not cover the replacement cost and/or service of the given part or asset.

Given the total number of parts that are predicted by the prediction component 132/932 to either require service or fail in the given time period for a particular user, the entitlement recommendation component 133 computes the total cost that a customer will have to pay if there is no entitlement plan. Then, the entitlement recommendation component 133, which includes a rules engine, applies rules to compute the cost of replacement/service under the user's current entitlement plan, and the cost of replacement/service under one or more new plans. The rules can be stored, for example, in the database 134. The entitlement recommendation component 133 also computes the differences in expenditures for the user under each scenario (e.g., no entitlement plan, current entitlement plan, one or more new entitlement plans). The computed expenditures include the cost for the entitlement plan if there is such a cost. The entitlement recommendation component 133 generates an entitlement recommendation for a user based upon the predicted asset and/or part failures and/or service requirements and the least cost to the customer. The generated recommendation includes a detailed explanation for the customer explaining the cost of switching to a different plan and/or remaining with a current scenario, as well as what assets/parts may require future service or replacement. The generated recommendation may also include an explanation of past activity (e.g., replacements/services that were needed by the user) on which the prediction may have been based.

For example, the entitlement recommendation component 133 performs a cost-benefit analysis based on the entitlement plan data 241, the customer installation data 242, the asset telemetry data 243 and the issues/tickets data 244. Based on the cost-benefit analysis, the recommendation generated by the entitlement recommendation component 133 may state that the user can switch to a higher-level entitlement plan by paying $X extra per cycle. The recommendation may include a further explanation that if the user does not switch to the higher-level entitlement plan, the user might have to pay $(X+Y) by the end of the cycle as there is an anticipated need to replace 4 parts. In addition or alternatively, the recommendation generated by the entitlement recommendation component 133 may state that the user can extend the current entitlement plan for 2 more cycles (by paying $(X+Y)) as there have been on-average replacement and service of $x in each cycle from the past 4 cycles. The foregoing examples are merely illustrative. It is to be understood that the recommendations generated by the entitlement recommendation component 133 will vary based on the particular entitlement plan data 241, customer installation data 242, asset telemetry data 243 and issues/tickets data 244 associated with a particular customer.

Figure 10:
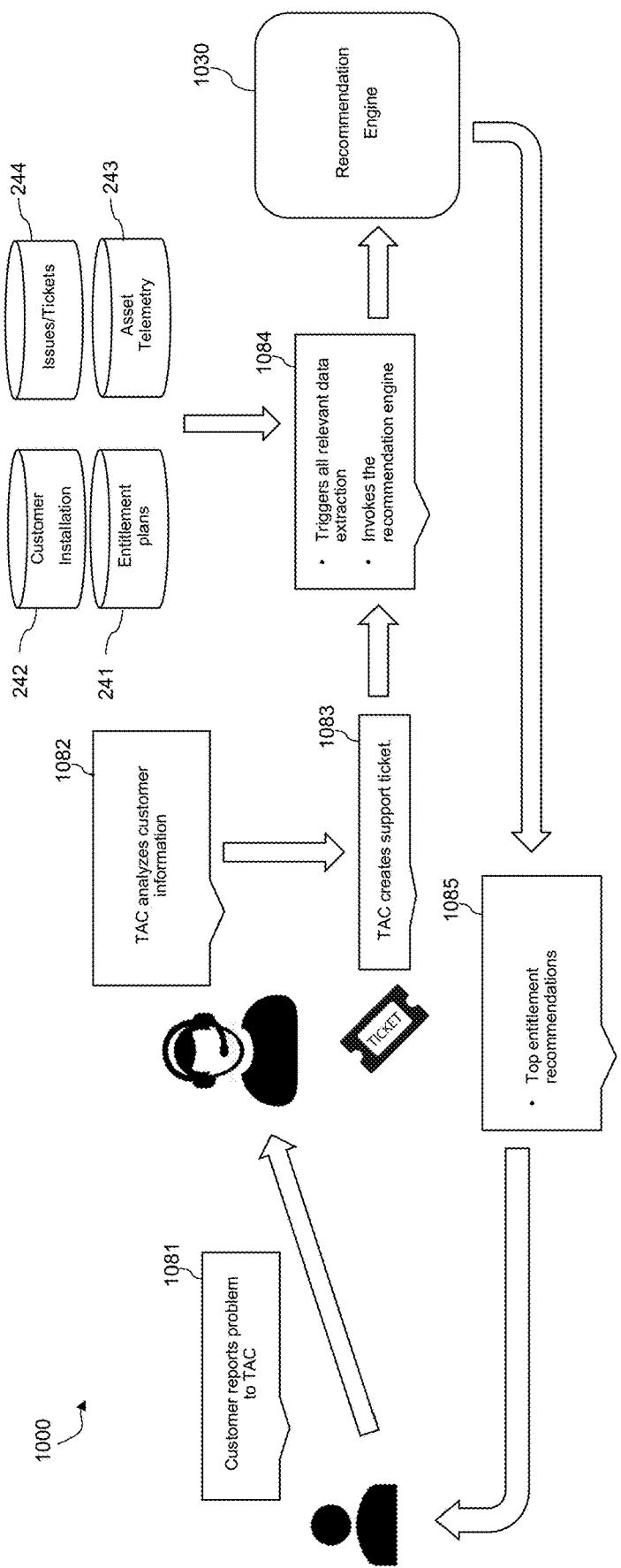
FIG. 10 depicts details of an operational flow for automatically generating customized entitlement recommendations according to an illustrative embodiment.

In an operational example, referring to the operational flow 1000 in FIG. 10, a customer reports a problem with an asset and/or part to a technical assistance center (TAC) (block 1081). At blocks 1082 and 1083, the TAC analyzes the customer information and the reported problem and creates a support ticket based on the reported issue. The generation of the support ticket triggers the data gathering and processing engine 120 of the entitlement recommendation platform 110 to extract data relevant to the customer and the information included in the created support ticket such as, for example, the customer, asset and/or part, entitlement and reported issues or problems (block 1084). The extracted data is from the entitlement plan, customer installation, asset telemetry and issues/tickets data 241-244 as described herein. The recommendation engine 130/1030, and more particularly, the failure prediction and entitlement recommendation components 132 and 133 determine which assets and/or parts associated with the customer will require replacement and/or service within a given time period, compute a cost for the replacement and/or service under a current entitlement plan for the customer, and compute a cost for the replacement and/or service under one or more new entitlement plans. The entitlement recommendation component 133 computes differences between the cost for the replacement and/or service under a current entitlement plan and any costs for the replacement and/or service under one or more new entitlement plans, and provides recommendations to the customer (block 1085) based on the computed differences. The recommendations may be ranked according to cost to the customer, where the entitlement plan resulting in the least overall predicted cost to the customer is ranked highest, and the entitlement plan with the highest overall predicted cost is ranked lowest. The recommendation may also include an option for no entitlement plan. As noted above, the generated recommendation may also include a detailed explanation explaining the costs associated with switching to a different plan and remaining with a current scenario, as well as what assets/parts may require future service or replacement. The generated recommendation may also include an explanation of past replacements/services that were needed by the user on which the predicted failures and costs were based.

According to one or more embodiments, the databases 127 and 134 used by the entitlement recommendation platform 110, as well as the enterprise databases 105 can be configured according to a relational database management system (RDBMS) (e.g., PostgreSQL). Databases 105, 127 and 134 in some embodiments are implemented using one or more storage systems or devices associated with the entitlement recommendation platform 110. In some embodiments, one or more of the storage systems utilized to implement the databases comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the entitlement recommendation platform 110, the data gathering and processing engine 120 and the recommendation engine 130 in other embodiments can be implemented at least in part externally to the entitlement recommendation platform 110, for example, as stand-alone servers, sets of servers or other types of systems coupled to the network 104. For example, the data gathering and processing engine 120 and the recommendation engine 130 may be provided as cloud services accessible by the entitlement recommendation platform 110.

The data gathering and processing engine 120 and the recommendation engine 130 in the FIG. 1 embodiment are each assumed to be implemented using at least one processing device. Each such processing device generally comprises at least one processor and an associated memory, and implements one or more functional modules for controlling certain features of the data gathering and processing engine 120 and/or the recommendation engine 130.

At least portions of the entitlement recommendation platform 110 and the components thereof may be implemented at least in part in the form of software that is stored in memory and executed by a processor. The entitlement recommendation platform 110 and the components thereof comprise further hardware and software required for running the entitlement recommendation platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the data gathering and processing engine 120, the recommendation engine 130 and other components of the entitlement recommendation platform 110 in the present embodiment are shown as part of the entitlement recommendation platform 110, at least a portion of the data gathering and processing engine 120, the recommendation engine 130 and other components of the entitlement recommendation platform 110 in other embodiments may be implemented on one or more other processing platforms that are accessible to the entitlement recommendation platform 110 over one or more networks. Such components can each be implemented at least in part within another system element or at least in part utilizing one or more stand-alone components coupled to the network 104.

It is assumed that the entitlement recommendation platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data gathering and processing engine 120, the recommendation engine 130 and other components of the entitlement recommendation platform 110, and the elements thereof can each be implemented in the form of one or more LXCs running on one or more VMs. Other arrangements of one or more processing devices of a processing platform can be used to implement the data gathering and processing engine 120 and the recommendation engine 130, as well as other components of the entitlement recommendation platform 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the entitlement recommendation platform 110 to reside in different data centers. Numerous other distributed implementations of the entitlement recommendation platform 110 are possible.

Accordingly, one or each of the data gathering and processing engine 120, the recommendation engine 130 and other components of the entitlement recommendation platform 110 can each be implemented in a distributed manner so as to comprise a plurality of distributed components implemented on respective ones of a plurality of compute nodes of the entitlement recommendation platform 110.

It is to be appreciated that these and other features of illustrative embodiments are presented by way of example only, and should not be construed as limiting in any way.

Accordingly, different numbers, types and arrangements of system components such as the data gathering and processing engine 120, the recommendation engine 130 and other components of the entitlement recommendation platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the entitlement recommendation platform can be offered to cloud infrastructure customers or other users as part of FaaS, CaaS and/or PaaS offerings.

Figure 11:
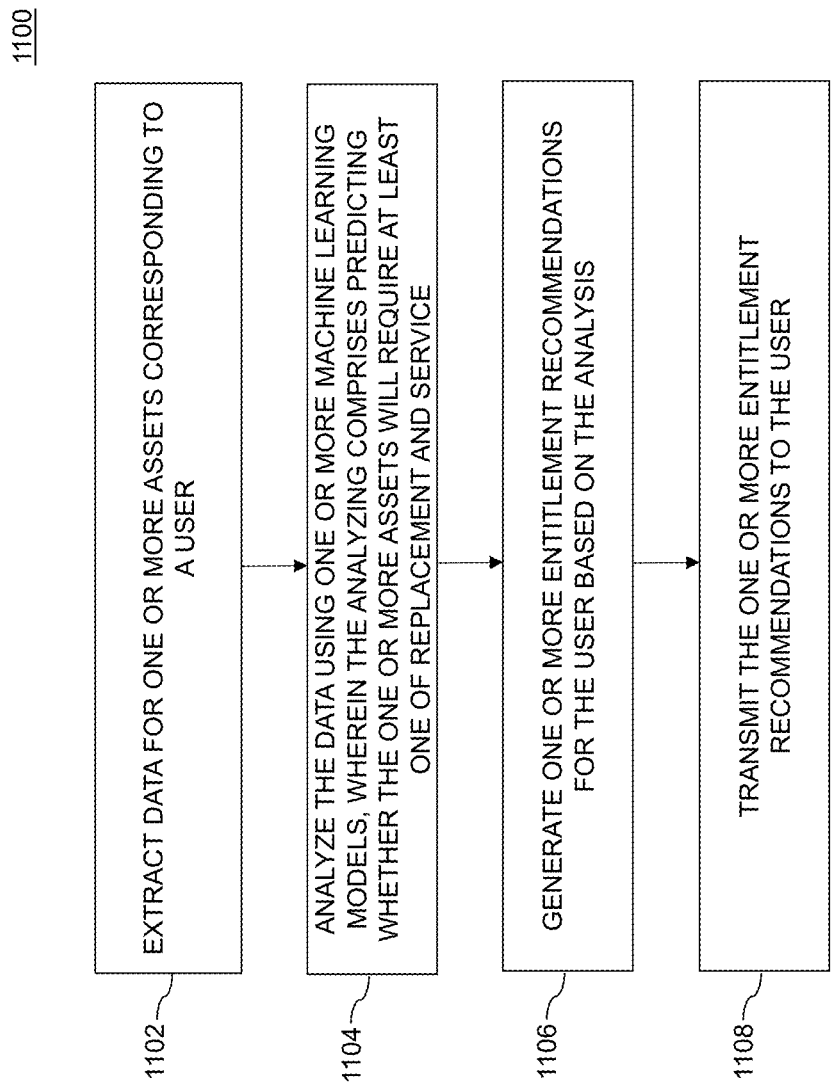
FIG. 11 depicts a process for automatically generating customized entitlement recommendations for customers according to an illustrative embodiment.

The operation of the information processing system 100 will now be described in further detail with reference to the flow diagram of FIG. 11. With reference to FIG. 11, a process 1100 for automatically generating customized entitlement recommendations as shown includes steps 1102 through 1108, and is suitable for use in the system 100 but is more generally applicable to other types of information processing systems comprising an entitlement recommendation platform configured for automatically generating customized entitlement recommendations.

In step 1102, data for one or more assets corresponding to a user is extracted. The one or more assets comprise, for example, hardware components and/or parts for the hardware components. The data comprises, for example, performance and historical data of the one or more assets such as, for example, when the asset was installed, whether and when the asset failed, was replaced and/or was serviced, the cost of replacement and/or service and the number of operational hours of the asset. The data also comprises, for example, service ticket information for the one or more assets including a description of the issue, the cost of the service/replacement and when the service/replacement was performed.

In step 1104, the data is analyzed using one or more machine learning models. The analyzing comprises predicting whether the one or more assets will require replacement and/or service. The predicting comprises using the one or more machine learning models to determine a remaining life of the one or more assets based on the service ticket information. The one or more machine learning models comprises, for example, a CNN.

In step 1106, one or more entitlement recommendations are generated for the user based on the analysis, and in step 1108, the one or more entitlement recommendations are transmitted to the user. In an embodiment, the generating of the one or more entitlement recommendations for the user comprises determining which of the one or more assets will require at least one of replacement and service within a given time period, computing a first cost for the at least one of the replacement and the service of the one or more assets within the given time period under a current entitlement plan for the user, and computing a second cost for the at least one of the replacement and/or the service of the one or more assets within the given time period under a new entitlement plan. A difference between the first and second costs is computed, wherein the one or more entitlement recommendations are based on the computed difference between the first and second costs.

In order to prepare the data for analysis by the one or more machine learning models, the process further includes stacking the data to generate a unified dataset, extracting data corresponding to a plurality of entitlement levels, and performing clustering of the data corresponding to a plurality of entitlement levels to generate a plurality of clusters based on entitlement level and incident cost. According to an embodiment, the plurality of clusters are assigned to the unified dataset.

The process also includes performing a correlation analysis on the data to identify related features of the data and performing feature scaling, variable encoding, natural language processing and/or feature vectorization on the data prior to the analyzing of the data.

According to one or more embodiments, the process also includes determining that an entitlement renewal reminder is to be transmitted to the user. The steps of the method are automatically triggered responsive to a service ticket request or responsive to the determination the entitlement renewal reminder is to be transmitted to the user.

It is to be appreciated that the FIG. 11 process and other features and functionality described above can be adapted for use with other types of information systems configured to execute entitlement recommendation services in an entitlement recommendation platform or other type of platform.

The particular processing operations and other system functionality described in conjunction with the flow diagram of FIG. 11 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 11 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with an entitlement recommendation platform as disclosed herein can provide a number of significant advantages relative to conventional arrangements. For example, unlike conventional techniques, the embodiments advantageously use machine learning techniques to provide automated generation of customized entitlement recommendations tailored to a user's assets and historical data. The embodiments provide functionality for automatically generating customized entitlement recommendations that are customized for different users. The embodiments use a machine learning model comprising, for example, a CNN, to leverage asset telemetry data when offering new entitlement plans or renewals to customers.

Unlike conventional techniques, the embodiments correlate service cases/tickets raised against the installed components of a customer with the customer's asset telemetry data to predict component failure and estimate costs to a customer under a current entitlement plan. Different entitlement options are generated based on the correlations, predictions and estimates, and are transmitted to a customer.

Using current techniques, entitlement plan options are static and based on a customer's installed assets at the point of recommendation. Current approaches fail to consider service and asset history or predicted failures based on the service and asset history. Advantageously, illustrative embodiments provide automated recommendation of entitlement proposals that contain an upgrade, a downgrade, or maintain status quo. Some embodiments estimate and recommend how much loss the customer would incur if he/she goes against the recommendation. Embodiments may also propose to downgrade from the current entitlement to a potentially lower cost or even basic entitlement. This can significantly save costs for the customer and at the same time give the service provider the ability to service the customers with a complete view of past and future entitlement management. These methods can significantly reduce equipment or service downtime experienced by the customer, thus increasing customer loyalty with a service provider's products and brands.

As additional advantages, the solutions according to the embodiments further utilize cross customer data and propose entitlements that are a best fit for a certain customer based on comparisons with other similar customers who have the same or similar sets of installed assets. The embodiments further rely on enterprise data representing real-time changes in customer, entitlement plan, asset and service ticket data to propose the best entitlement plan for a given customer at a given time and in a given location.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the entitlement recommendation platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and an entitlement recommendation platform in illustrative embodiments. These and other cloud-based systems in illustrative embodiments can include object stores.

Illustrative embodiments of processing platforms will now be described in greater detail with reference to FIGS. 12 and 13. Although described in the context of system 100, these platforms may also be used to implement at least portions of other information processing systems in other embodiments.

Figure 12:
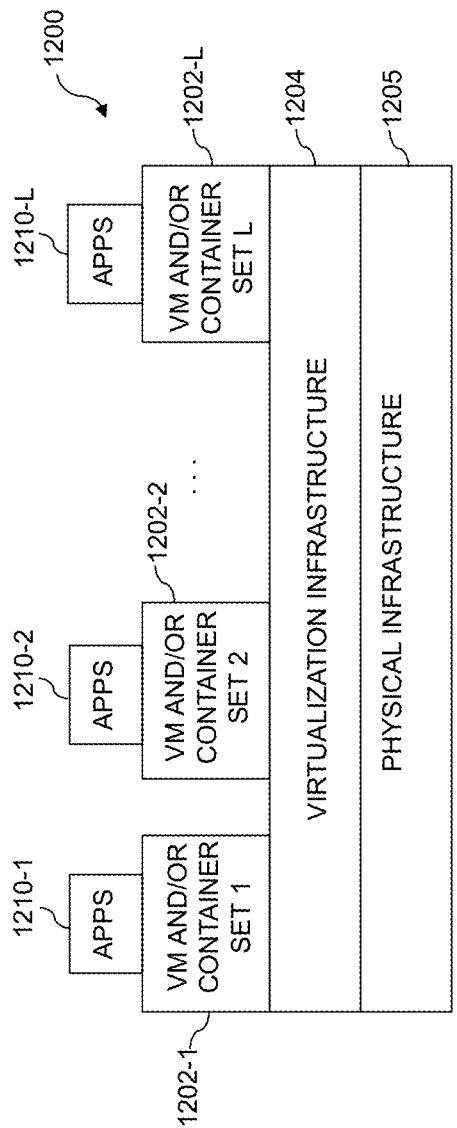
FIGS. 12 and 13 show examples of processing platforms that may be utilized to implement at least a portion of an information processing system according to illustrative embodiments.
Figure 13:
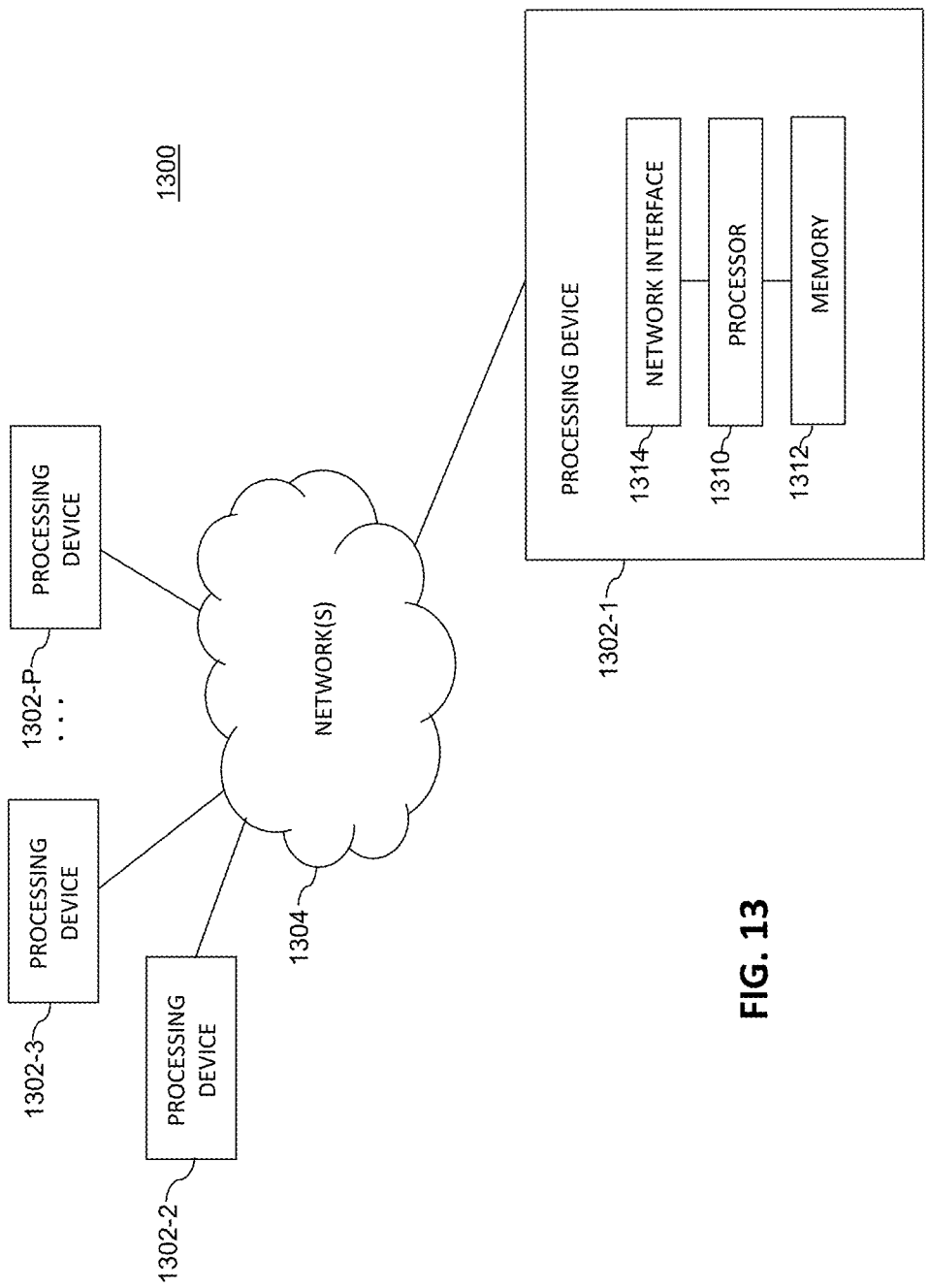

FIG. 12 shows an example processing platform comprising cloud infrastructure 1200. The cloud infrastructure 1200 comprises a combination of physical and virtual processing resources that may be utilized to implement at least a portion of the information processing system 100. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. A hypervisor platform may be used to implement a hypervisor within the virtualization infrastructure 1204, where the hypervisor platform has an associated virtual infrastructure management system. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-P, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312. The processor 1310 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1312 may comprise random access memory (RAM), read-only memory (ROM), flash memory or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the entitlement recommendation platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and entitlement recommendation platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

receiving a support request from a user corresponding to one or more assets;

generating a service ticket corresponding to the support request;

updating service ticket data in one or more databases in real-time responsive to the generation of the service ticket;

triggering automated extraction of data for the one or more assets responsive to the generation of the service ticket, wherein the data corresponds to the user and includes the service ticket data;

extracting the data for the one or more assets, wherein at least a portion of the data is extracted from at least one of the one or more databases and from the one or more assets via one or more backend application programming interfaces of an enterprise;

wherein the data comprises a plurality of data categories corresponding to performance data, current and past service ticket information and entitlement plan data for the one or more assets, and wherein at least a portion of the data comprises real-time changes to one or more of the plurality of data categories;

converting the data for processing by one or more machine learning models, wherein the converting comprises transforming the plurality of data categories into vector form;

analyzing the data using the one or more machine learning models, wherein the analyzing comprises predicting whether the one or more assets will require at least one of replacement and service;

wherein the predicting comprises using the one or more machine learning models to determine at least one of: (i) a remaining life of the one or more assets; and (ii) a time period in which the one or more assets will require service;

reading an output of the one or more machine learning models to generate one or more entitlement recommendations for the user based on the analysis, wherein the one or more entitlement recommendations comprise a first cost for at least one of replacement and service of the one or more assets under a current entitlement plan for the user, and a second cost for the at least one of the replacement and the service of the one or more assets under a new entitlement plan; and transmitting, in response to the support request, the one or more entitlement recommendations to the user, wherein at least a portion of the one or more entitlement recommendations is generated in a textual format readable by the user on a user device;

wherein the steps of the method are executed by a processing device operatively coupled to a memory.

2. The method of claim 1, wherein the one or more assets comprise at least one of hardware components and parts for the hardware components.

3. The method of claim 1, further comprising stacking the data to generate a unified dataset.

4. The method of claim 3, further comprising:
extracting data corresponding to a plurality of entitlement levels; and
performing clustering of the data corresponding to the plurality of entitlement levels to generate a plurality of clusters based on entitlement level and incident cost.

5. The method of claim 4, further comprising assigning the plurality of clusters to the unified dataset.

6. The method of claim 1, further comprising performing a correlation analysis on the data to identify related features of the data.

7. The method of claim 1, wherein the converting further comprises at least one of feature scaling, variable encoding and natural language processing on the data prior to the analyzing of the data.

8. The method of claim 1, wherein generating the one or more entitlement recommendations for the user comprises:
computing the first cost for at least one of the replacement and service of the one or more assets within the time period in which the one or more assets will require service; and
computing the second cost for the at least one of the replacement and the service of the one or more assets within the time period in which the one or more assets will require service;
computing a difference between the first and second costs;
wherein the one or more entitlement recommendations are based on the computed difference between the first and second costs.

9. The method of claim 1, further comprising:
determining that an entitlement renewal reminder is to be transmitted to the user;
wherein the steps of the method are automatically executed by the processing device responsive to the determination the entitlement renewal reminder is to be transmitted to the user.

10. The method according to claim 1, wherein the one or more machine learning models comprises a convolutional neural network.

11. An apparatus comprising:
a processing device operatively coupled to a memory and configured to:
receive a support request from a user corresponding to one or more assets;
generate a service ticket corresponding to the support request;
update service ticket data in one or more databases in real-time responsive to the generation of the service ticket;
trigger automated extraction of data for the one or more assets responsive to the generation of the service ticket, wherein the data corresponds to the user and includes the service ticket data;
extract the data for the one or more assets, wherein at least a portion of the data is extracted from at least one of the one or more databases and from the one or more assets via one or more backend application programming interfaces of an enterprise;
wherein the data comprises a plurality of data categories corresponding to performance data, current and past service ticket information and entitlement plan data for the one or more assets, and wherein at least a portion of the data comprises real-time changes to one or more of the plurality of data categories;
convert the data for processing by one or more machine learning models, wherein the converting comprises transforming the plurality of data categories into vector form;
analyze the data using the one or more machine learning models, wherein in analyzing the data, the processing device is configured to predict whether the one or more assets will require at least one of replacement and service;
wherein the predicting comprises using the one or more machine learning models to determine at least one of: (i) a remaining life of the one or more assets; and (ii) a time period in which the one or more assets will require service;
read an output of the one or more machine learning models to generate one or more entitlement recommendations for the user based on the analysis, wherein the one or more entitlement recommendations comprise a first cost for at least one of replacement and service of the one or more assets under a current entitlement plan for the user, and a second cost for the at least one of the replacement and the service of the one or more assets under a new entitlement plan; and
transmit, in response to the support request, the one or more entitlement recommendations to the user, wherein at least a portion of the one or more entitlement recommendations is generated in a textual format readable by the user on a user device.

12. The apparatus of claim 11, wherein the one or more assets comprise at least one of hardware components and parts for the hardware components.

13. An article of manufacture comprising a non-transitory processor-readable storage medium having stored therein program code of one or more software programs, wherein the program code when executed by at least one processing device causes said at least one processing device to perform the steps of:
receiving a support request from a user corresponding to one or more assets;
generating a service ticket corresponding to the support request;
updating service ticket data in one or more databases in real-time responsive to the generation of the service ticket;
triggering automated extraction of data for the one or more assets responsive to the generation of the service ticket, wherein the data corresponds to the user and includes the service ticket data;
extracting the data for the one or more assets, wherein at least a portion of the data is extracted from at least one of the one or more databases and from the one or more assets via one or more backend application programming interfaces of an enterprise;

wherein the data comprises a plurality of data categories corresponding to performance data, current and past service ticket information and entitlement plan data for the one or more assets, and wherein at least a portion of the data comprises real-time changes to one or more of the plurality of data categories;

converting the data for processing by one or more machine learning models, wherein the converting comprises transforming the plurality of data categories into vector form;

analyzing the data using the one or more machine learning models, wherein in analyzing the data, the program code further causes said at least one processing device to perform the step of predicting whether the one or more assets will require at least one of replacement and service;

wherein the predicting comprises using the one or more machine learning models to determine at least one of: (i) a remaining life of the one or more assets; and (ii) a time period in which the one or more assets will require service;

reading an output of the one or more machine learning models to generate one or more entitlement recommendations for the user based on the analysis, wherein the one or more entitlement recommendations comprise a first cost for at least one of replacement and service of the one or more assets under a current entitlement plan for the user, and a second cost for the at least one of the replacement and the service of the one or more assets under a new entitlement plan; and transmitting, in response to the support request, the one or more entitlement recommendations to the user, wherein at least a portion of the one or more entitlement recommendations is generated in a textual format readable by the user on a user device.

14. The article of manufacture of claim 13, wherein the converting further comprises using one or more natural language processing and understanding techniques to identify at least one of keywords and key phrases in the data.

15. The article of manufacture of claim 13, wherein the transforming of the plurality of data categories into vector form comprises:

transforming a plurality of textual portions respectively corresponding to the plurality of data categories into a plurality of numerical values respectively corresponding to the plurality of textual portions; and transforming the plurality of numerical values to a vector representing a combination of the plurality of numerical values.

16. The apparatus of claim 11, wherein the converting further comprises using one or more natural language processing and understanding techniques to identify at least one of keywords and key phrases in the data.

17. The apparatus of claim 11, wherein the transforming of the plurality of data categories into vector form comprises:

transforming a plurality of textual portions respectively corresponding to the plurality of data categories into a plurality of numerical values respectively corresponding to the plurality of textual portions; and transforming the plurality of numerical values to a vector representing a combination of the plurality of numerical values.

18. The method of claim 1, wherein the converting further comprises using one or more natural language processing and understanding techniques to identify at least one of keywords and key phrases in the data.

19. The method of claim 1, wherein the transforming of the plurality of data categories into vector form comprises:

transforming a plurality of textual portions respectively corresponding to the plurality of data categories into a plurality of numerical values respectively corresponding to the plurality of textual portions; and transforming the plurality of numerical values to a vector representing a combination of the plurality of numerical values.

20. The method of claim 18, wherein the converting further comprises:

stacking the data to generate a unified dataset based at least in part on the at least one of the identified keywords and key phrases;

transforming one or more unsupervised datasets into one or more supervised datasets, wherein the transforming comprises clustering at least the entitlement plan data to generate a plurality of clusters based at least in part on entitlement level and incident cost; and assigning respective ones of the plurality of clusters as a label for one or more rows of the unified dataset.

* * * * *